United States Patent
Hirota et al.

(10) Patent No.: US 8,448,428 B2
(45) Date of Patent: May 28, 2013

(54) EXHAUST GAS PURIFICATION SYSTEM FOR INTERNAL COMBUSTION ENGINE

(75) Inventors: Shinya Hirota, Susono (JP); Yoshinori Yamashita, Kakegawa (JP)

(73) Assignees: Toyota Jidosha Kabushiki Kaisha, Tokyo (JP); Cataler Corporation, Kakegawa-shi (JP)

( * ) Notice: Subject to any disclaimer, the term of this patent is extended or adjusted under 35 U.S.C. 154(b) by 130 days.

(21) Appl. No.: 13/255,189

(22) PCT Filed: Mar. 10, 2010

(86) PCT No.: PCT/IB2010/000500
§ 371 (c)(1),
(2), (4) Date: Sep. 7, 2011

(87) PCT Pub. No.: WO2010/103380
PCT Pub. Date: Sep. 16, 2010

(65) Prior Publication Data
US 2012/0000190 A1 Jan. 5, 2012

(30) Foreign Application Priority Data
Mar. 11, 2009 (JP) ................................ 2009-058568

(51) Int. Cl.
*F01N 3/10* (2006.01)
(52) U.S. Cl.
USPC ................................. 60/301; 60/286; 60/295
(58) Field of Classification Search
USPC .......................................... 60/301, 286, 284
See application file for complete search history.

(56) References Cited

U.S. PATENT DOCUMENTS

| 2004/0098968 A1 | 5/2004 | van Nieuwstadt et al. |
| 2006/0000202 A1* | 1/2006 | Ripper et al. .................... 60/286 |
| 2009/0000280 A1* | 1/2009 | Ichikawa et al. ................ 60/286 |
| 2011/0052454 A1* | 3/2011 | Kato ............................. 422/171 |

FOREIGN PATENT DOCUMENTS
EP 1 602 403 A2 12/2005
(Continued)

OTHER PUBLICATIONS

Japanese Office Action issued in Application No. 2009-058568; Dated Dec. 24, 2010 (With Translation).

(Continued)

*Primary Examiner* — Thomas Denion
*Assistant Examiner* — Kelsey Gambrel
(74) *Attorney, Agent, or Firm* — Oliff & Berridge, PLC (57) ABSTRACT

In an exhaust gas purification system for an internal combustion engine, a $NO_x$ selective reduction catalyst for reducing $NO_x$ with ammonia that is adsorbed on the $NO_x$ selective reduction catalyst is disposed in an exhaust passage of the engine. In the $NO_x$ selective reduction catalyst, ammonia in a first adsorption state that is adsorbed at a low temperature and ammonia in a second adsorption state that is adsorbed at a high temperature are present. Because ammonia, which has been in the first adsorption state and which is desorbed from the $NO_x$ selective reduction catalyst, tends to be discharged to the atmosphere, a control section that estimates an adsorption amount of ammonia in the first adsorption state is provided in the exhaust gas purification system for the internal combustion engine in order to control the adsorption amount of ammonia in the first adsorption state within a specified level.

8 Claims, 6 Drawing Sheets

FOREIGN PATENT DOCUMENTS

| | | |
|---|---|---|
| EP | 1602403 A2 * | 12/2005 |
| JP | A-2001-303934 | 10/2001 |
| JP | A-2003-286828 | 10/2003 |
| JP | A-2003-293737 | 10/2003 |
| JP | A-2006-017115 | 1/2006 |
| JP | A-2008-280955 | 11/2008 |
| JP | A-2008-303821 | 12/2008 |
| JP | A-2009-007968 | 1/2009 |

OTHER PUBLICATIONS

Written Opinion of the International Searching Authority issued in Application No. PCT/IB2010/000500; Dated Jun. 24, 2010,.

International Preliminary Report on Patentability issued in Application No. PCT/IB2010/000500; Dated May 5, 2011.

International Search Report issued in Application No. PCT/IB2010/000500, Dated Jun. 24, 2010.

* cited by examiner

EXHAUST GAS PURIFICATION SYSTEM FOR INTERNAL COMBUSTION ENGINE

BACKGROUND OF THE INVENTION

1. Field of the Invention

The present invention relates to an exhaust gas purification system for an internal combustion engine.

2. Description of the Related Art

An internal combustion engine is known in which a $NO_x$ selective reduction catalyst is disposed in an exhaust passage of the engine and supplied with aqueous urea solution. The $NO_x$ selective reduction catalyst adsorbs ammonia that is produced from the urea solution, and selectively reduces $NO_x$ in exhaust gases with adsorbed ammonia (see Japanese Patent Application Publication No. 2003-293737 (JP-A-2003-293737), for example). When $NO_x$ is reduced with ammonia, which is adsorbed as described above, an amount of ammonia as large as possible is preferably adsorbed on the $NO_x$ selective reduction catalyst in order to attain favorable $NO_x$ reduction efficiency. In this internal combustion engine, a target ammonia adsorption amount that is slightly less than a saturated ammonia adsorption amount is set in advance, and a supply amount of the urea solution is controlled such that the amount of ammonia that is adsorbed on the $NO_x$ selective reduction catalyst equals the target ammonia adsorption amount.

From studies on ammonia adsorption onto the $NO_x$ selective reduction catalyst such as described above, it is concluded that there exist at least two types of an ammonia adsorption state. Specifically, in a first adsorption state, when a temperature of the $NO_x$ selective reduction catalyst is in a low-temperature region such as below 200° C., ammonia is adsorbed onto the $NO_x$ selective reduction catalyst, and upon a temperature increase in the $NO_x$ selective reduction catalyst, an ammonia desorption amount reaches maximum in the low-temperature region. In a second adsorption state, when the temperature of the $NO_x$ selective reduction catalyst is in a high-temperature region such as above 200° C., ammonia is adsorbed onto or has already been adsorbed on the $NO_x$ selective reduction catalyst, and upon the temperature increase in the $NO_x$ selective reduction catalyst, the ammonia desorption amount reaches maximum in the high-temperature region. The studies revealed that ammonia that is desorbed from the first adsorption state is more likely to pass through the $NO_x$ selective reduction catalyst without purifying $NO_x$ than ammonia in that is desorbed from the second adsorption state.

In other words, almost all ammonia that passes through the $NO_x$ selective reduction catalyst and is discharged to the atmosphere is in the first adsorption state. Thus, in order to control an amount of ammonia that is discharged to the atmosphere, it is necessary to control an adsorption amount of ammonia in the first adsorption state.

However, as in the above known internal combustion engine, if the total ammonia adsorption amount is controlled, the adsorption amount of ammonia in the first adsorption state may account for a substantial portion of the total ammonia adsorption amount. In such a case, if a vehicle is accelerated, and thereby the temperature of the $NO_x$ selective reduction catalyst exceeds the temperature in the low-temperature region, a large amount of ammonia in the first adsorption state is desorbed. Consequently, the large amount of ammonia is discharged to the atmosphere.

In order to solve the problem as described above, it is necessary to control the adsorption amount of ammonia in the first adsorption state, and consequently, it is necessary to estimate the adsorption amount of ammonia in the first adsorption state.

SUMMARY OF THE INVENTION

In an aspect of the present invention, an exhaust gas purification system for an internal combustion engine includes a $NO_x$ selective reduction catalyst that is disposed in an exhaust passage of the engine. Ammonia is supplied and adsorbed onto the $NO_x$ selective reduction catalyst, and $NO_x$ in exhaust gases is primarily and selectively reduced with adsorbed ammonia. In this exhaust gas purification system, there exist two types of ammonia adsorption state on the $NO_x$ selective reduction catalyst, which are a first adsorption state and a second adsorption state. In the first adsorption state, ammonia is adsorbed onto the $NO_x$ selective reduction catalyst whose temperature is in a low-temperature region, and upon an increase in the temperature of the $NO_x$ selective reduction catalyst, an ammonia desorption amount reaches maximum in the low-temperature region. In the second adsorption state, ammonia is adsorbed onto or has already been adsorbed on the $NO_x$ selective reduction catalyst whose temperature is in a high-temperature region and is higher than the highest temperature in the low-temperature region, and upon the increase in the temperature of the $NO_x$ selective reduction catalyst, the ammonia desorption amount reaches maximum in the high-temperature region. Ammonia, which has been in the first adsorption state and which is desorbed from the $NO_x$ selective reduction catalyst, is more likely to pass through the $NO_x$ selective reduction catalyst without purifying $NO_x$ than ammonia, which has been in the second adsorption state and which is desorbed from the $NO_x$ selective reduction catalyst. The exhaust gas purification system for the internal combustion engine includes a control section that estimates an adsorption amount of ammonia in the first adsorption state in order to control the adsorption amount of ammonia in the first adsorption state.

The control section can control the adsorption amount of ammonia in the first adsorption state by estimating the adsorption amount of ammonia in the first adsorption state. Accordingly, the exhaust gas purification system for the internal combustion engine can control ammonia emissions to the atmosphere, for example.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
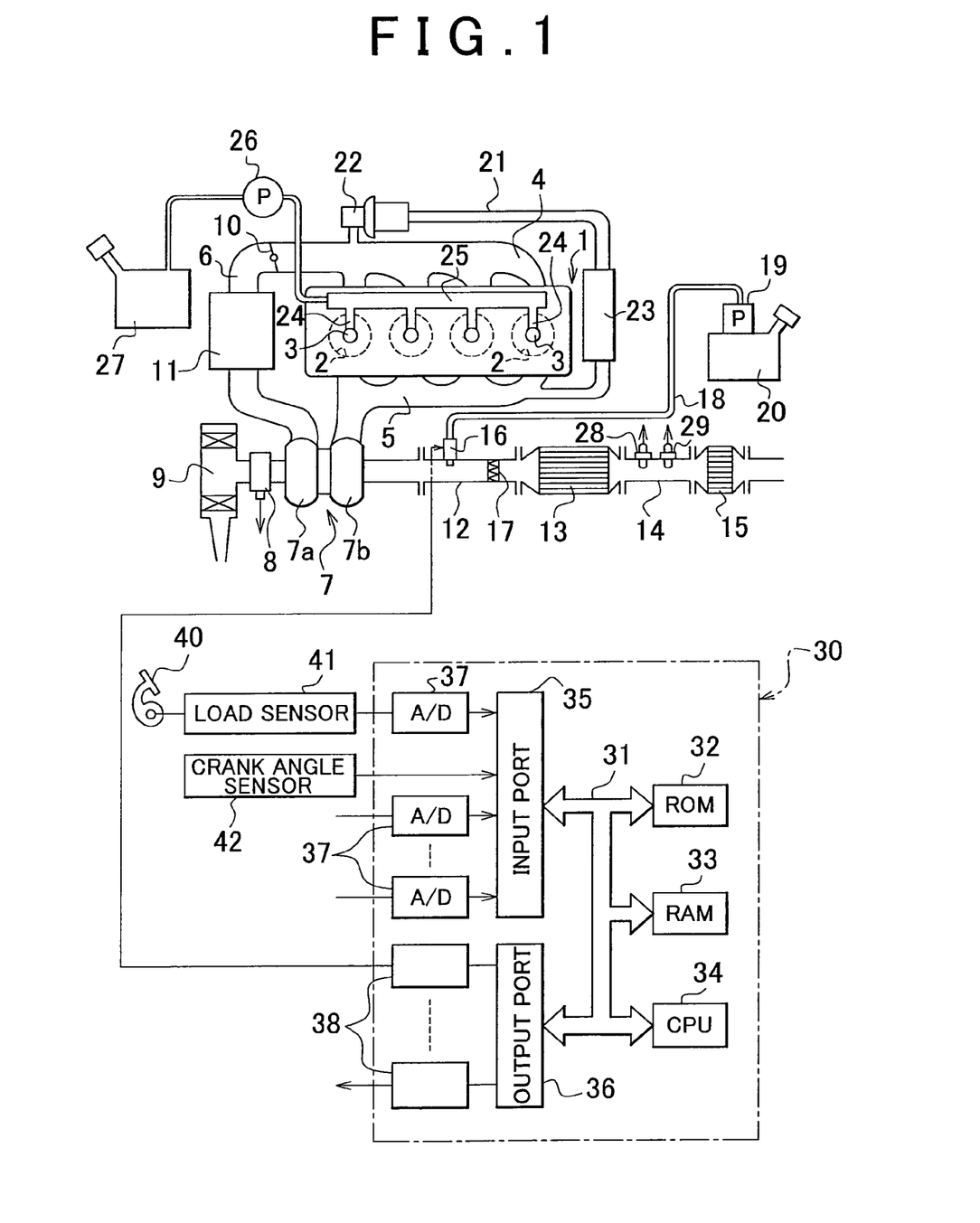
FIG. 1 is a general view of an internal combustion engine of a compression ignition type.

FIG. 1 is a general view of an internal combustion engine of a compression ignition type. Referring to FIG. 1, the internal combustion engine includes an engine body 1, a combustion chamber 2 for each cylinder, an electronically-controlled fuel injection valve 3 for injecting fuel into the corresponding combustion chamber 2, an intake manifold 4, and an exhaust manifold 5. An outlet port of a compressor 7a in an exhaust turbocharger 7 is connected to the intake manifold 4 through an intake duct 6, while an inlet port of the compressor 7a is connected to an air cleaner 9 through an intake air amount detector 8. The intake duct 6 includes therein a throttle valve 10 that is driven by a stepper motor, and also includes a cooling system 11 therearound for cooling intake air that flows through the intake duct 6. In an embodiment shown in FIG. 1, engine coolant is guided into the cooling system 11 to cool the intake air.

An inlet of an exhaust turbine 7b in the exhaust turbocharger 7 is connected to the exhaust manifold 5, while an outlet of the exhaust turbine 7b is connected to an inlet of a $NO_x$ selective reduction catalyst 13 through an exhaust pipe 12. An outlet of the $NO_x$ selective reduction catalyst 13 is connected to an oxidation catalyst 15 through an exhaust pipe 14. A urea solution supply valve 16 is disposed in the exhaust pipe 12 upstream of the $NO_x$ selective reduction catalyst 13. A dispersion plate 17 that disperses the urea solution is disposed in the exhaust pipe 12 downstream of the urea solution supply valve 16, which is connected to a urea solution tank 20 through a supply pipe 18 and a supply pump 19. The supply pump 19 pressurizes to spray the urea solution, which is stored in the urea solution tank 20, from the urea solution supply valve 16 into exhaust gases flowing through the exhaust pipe 12, and thereby ammonia (($NH_2$)$_2$CO+ $H_2O \rightarrow 2NH_3+CO_2$), which is produced by decomposition of urea, reduces $NO_x$ in the exhaust gases in the $NO_x$ selective reduction catalyst 13.

The intake manifold 4 and the exhaust manifold 5 are interconnected through an exhaust gas recirculation (hereinafter referred to as "EGR") passage 21, in which an electronically-controlled EGR control valve 22 is disposed. A cooling system 23 is disposed around the EGR passage 21 to cool EGR gas that flows through the EGR passage 21. In the embodiment shown in FIG. 1, the engine coolant is guided into the cooling system 23 to cool the EGR gas. Each of the fuel injection valves 3 is connected to a common rail 25, and the common rail 25 is connected to a fuel tank 27 through an electronically-controlled fuel pump 26 that can change a discharge rate of fuel. The fuel stored in the fuel tank 27 is delivered by the fuel pump 26 to the common rail 25 and then to each of the fuel injection valves 3 through the corresponding fuel supply pipe 24.

An electronic control unit 30 is a digital computer that includes a read only memory (ROM) 32, a random access memory (RAM) 33, a microprocessor (CPU) 34, an input port 35; and an output port 36 that are all interconnected via an interactive bus 31. A $NO_x$ sensor 28 that detects concentration of $NO_x$ in the exhaust gases and a temperature sensor 29 that detects an exhaust gas temperature are disposed in the exhaust pipe 14 downstream of the $NO_x$ selective reduction catalyst 13. The input port 35 receives output signals from the $NO_x$ sensor 28, the temperature sensor 29, and the intake air amount detector through corresponding analog-to-digital converters (ADCs) 37.

An accelerator pedal 40 is connected to a load sensor 41 that produces output voltage proportional to an displacement amount of the accelerator pedal 40. The input port 35 receives the output voltage of the load sensor 41 through the corresponding ADC 37. The input port 35 is connected to a crankshaft sensor 42 that produces an output pulse per rotation of a crankshaft at 15 degrees, for example. The output port 36 is connected to each of the fuel injection valves 3, the stepper motor that drives the throttle valve 10, the urea solution supply valve 16, the supply pump 19, the EGR control valve 22, and the fuel pump 26 through corresponding drive circuits 38.

In the embodiment shown in FIG. 1, the $NO_x$ selective reduction catalyst 13 includes Fe-zeolite with favorable $NO_x$ purification efficiency that adsorbs ammonia. The oxidation catalyst 15 is of a rare metal type that includes platinum, and oxidizes ammonia that is leaked from the $NO_x$ selective reduction catalyst 13.

As described above, there exist a first adsorption state and a second adsorption state of ammonia on the $NO_x$ selective reduction catalyst 13. In the first adsorption state, ammonia is adsorbed onto the $NO_x$ selective reduction catalyst 13 whose temperature is equal to or lower than a specified value and thus in the low-temperature region. When the temperature of the $NO_x$ selective reduction catalyst 13 is increased, an ammonia desorption amount reaches maximum in the low-temperature region. In the second adsorption state, ammonia is adsorbed onto or has already been adsorbed on the $NO_x$ selective reduction catalyst 13 whose temperature is higher than the specified value and thus in the high-temperature region. When the temperature of the $NO_x$ selective reduction catalyst 13 is increased, the ammonia desorption amount reaches maximum in the high-temperature region. The studies shows that ammonia desorbed from the first adsorption state is more likely to pass through the $NO_x$ selective reduction catalyst 13 without purifying $NO_x$ than ammonia desorbed from the second adsorption state. In the invention, "ammonia which has been in the first adsorption state, and which is desorbed from the $NO_x$ selective reduction catalyst" is referred to as "ammonia desorbed from the first adsorption state", and "ammonia which has been in the second adsorption state, and which is desorbed from the $NO_x$ selective reduction catalyst" is referred to as "ammonia desorbed from the second adsorption state".

Figure 2:
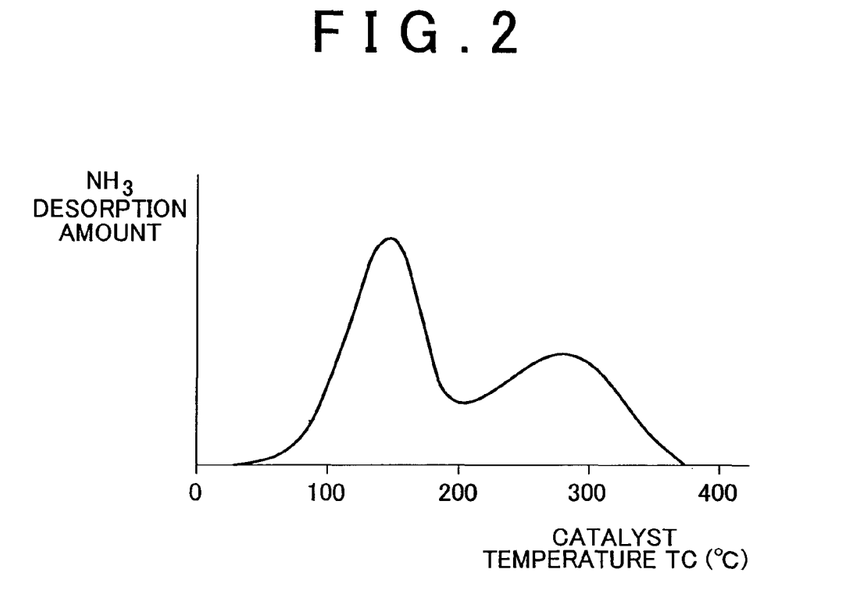
FIG. 2 is a graph that represents an ammonia desorption amount.

FIG. 2 is a graph showing an example of a result of an experiment. In the experiment, ammonia ($NH_3$) is sufficiently adsorbed onto the $NO_x$ selective reduction catalyst, and a temperature TC of the $NO_x$ selective reduction catalyst is then gradually increased. FIG. 2 represents a change in the ammonia desorption amount with a gradual temperature increase. In this experiment, the above specified temperature of the $NO_x$ selective reduction catalyst is set at approximately 200° C. Thus, the temperature of the $NO_x$ selective reduction catalyst is at or below 200° C. in the low-temperature region but above 200° C. in the high-temperature region. Ammonia that is adsorbed at or below 200° C. (in the low-temperature region) is in the first adsorption state while ammonia that is adsorbed above 200° C. (in the high-temperature region) is in the second adsorption state.

As represented in FIG. 2, there are two peaks of the ammonia desorption amount as the temperature TC of the $NO_x$ selective reduction catalyst increases. The first peak appears in the low-temperature region while the second peak appears in the high-temperature region. When ammonia is adsorbed onto or has already been adsorbed on the $NO_x$ selective reduction catalyst in the high-temperature region, ammonia is activated or enters into the second adsorption state. When ammonia is activated or enters into the second adsorption state, as described above, it is contemplated that ammonia is desorbed at a higher temperature than a temperature at which ammonia in the first adsorption state is desorbed. Thus, as shown in FIG. 2, the ammonia desorption amount from the second adsorption state reaches maximum in the high-temperature region.

$NO_x$ in the exhaust gases primarily reacts with ammonia that is adsorbed on the $NO_x$ selective reduction catalyst 13, and is reduced. However, when the temperature of the $NO_x$ selective reduction catalyst 13 is in the high-temperature region, $NO_x$ in the exhaust gases also reacts on the $NO_x$ selective reduction catalyst 13 with ammonia that is desorbed from the $NO_x$ selective reduction catalyst 13. This eliminates the possibility that a large amount of desorbed ammonia from the $NO_x$ selective reduction catalyst 13 is discharged to the atmosphere.

Meanwhile, even when the temperature of the $NO_x$ selective reduction catalyst 13 is in the low-temperature region, the $NO_x$ in the exhaust gas reacts with adsorbed ammonia on the $NO_x$ selective reduction catalyst 13, and is reduced as long as adsorbed ammonia is activated. In relation to the above, the experiment has shown that relatively high $NO_x$ purification efficiency can be achieved by the $NO_x$ selective reduction catalyst 13 in the low-temperature region in a following case: the temperature of the $NO_x$ selective reduction catalyst 13 is increased to the high-temperature region and ammonia is adsorbed in an activated state, then a supply of ammonia is cut off and the temperature of the $NO_x$ selective reduction catalyst 13 is decreased to the low-temperature region.

In other words, the experiment has shown that, once activated or entering into the second adsorption state, adsorbed ammonia remains to be activated in the second adsorption state even when the temperature of the $NO_x$ selective reduction catalyst 13 is decreased to the low-temperature region. Thus, the favorable $NO_x$ purification efficiency can be achieved by the $NO_x$ selective reduction catalyst 13 even in the low-temperature region as long as the large amount of ammonia is adsorbed in the activated state.

On the other hand, ammonia that is adsorbed onto the $NO_x$ selective reduction catalyst 13 in the low-temperature region is hardly activated. When the temperature of the $NO_x$ selective reduction catalyst 13 is increased in this state, ammonia that is hardly activated or in the first adsorption state is desorbed from the $NO_x$ selective reduction catalyst 13. As shown in FIG. 2, the desorption amount of ammonia, as described above, reaches maximum when the temperature of the $NO_x$ selective reduction catalyst 13 is in the low-temperature region.

$NO_x$ in the exhaust gases hardly reacts with ammonia that has been desorbed from the first adsorption state. Thus, desorbed ammonia passes through the selective reduction catalyst 13 without purifying $NO_x$. Ammonia that has passed through the $NO_x$ selective reduction catalyst 13 is oxidized by the oxidation catalyst 15. However, when a too large amount of ammonia is present for the oxidation catalyst 15, or when the oxidation catalyst 15 is not sufficiently activated, the large amount of unoxidized ammonia is discharged to the atmosphere.

In order to prevent discharge of the large amount of ammonia to the atmosphere, it is necessary to control the adsorption amount of ammonia in the first adsorption state. For this purpose, in the present invention, the adsorption amount of ammonia in the first adsorption state is estimated.

An issue regarding ammonia emissions to the atmosphere is concentration of the ammonia emissions. In practice, it is necessary to control the ammonia emissions within an allowable concentration level, which is set in advance. In the present invention, in order to control the concentration of the ammonia, which is desorbed from the first adsorption state upon the temperature increase of the $NO_x$ selective reduction catalyst 13, within the certain allowable level, the adsorption amount of ammonia in the first adsorption state is controlled on the basis of the estimated adsorption amount of ammonia in the first adsorption state.

More specifically, in the present invention, a predetermined target ammonia adsorption amount is set in advance in order to control the concentration of ammonia, which is desorbed from the first adsorption state upon the temperature increase of the $NO_x$ selective reduction catalyst 13, within the certain allowable level. Also, a supply amount of the urea solution from the urea solution supply valve 16, that is, a supply amount of ammonia is controlled such that the ammonia adsorption amount in the first adsorption state does not exceed the target ammonia adsorption amount.

Figure 3:
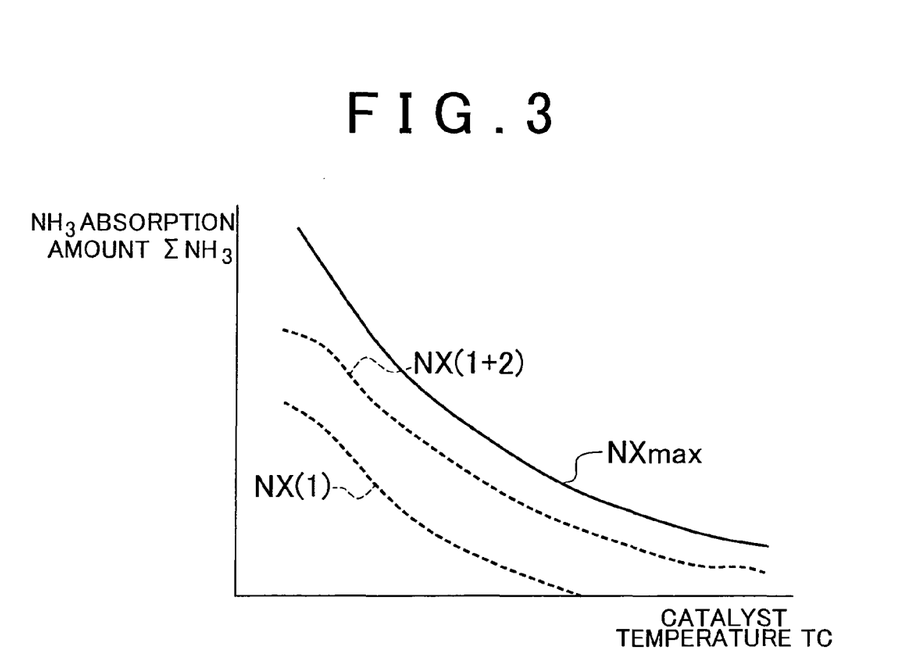
FIG. 3 is a graph that represents a target ammonia adsorption amount in accordance with embodiments of the present invention.

A description will now be made on the target ammonia adsorption amount with reference to FIG. 3. A horizontal axis of FIG. 3 represents the temperature TC of the $NO_x$ selective reduction catalyst 13 while a vertical axis of FIG. 3 represents an ammonia adsorption amount $\Sigma NH_3$ on the $NO_x$ selective reduction catalyst 13. Referring to FIG. 3, $NX_{max}$ represents the ammonia adsorption amount on the $NO_x$ selective reduction catalyst 13 in a saturated state, that is, a saturated adsorption amount. As apparent from FIG. 3, saturated ammonia adsorption amount $NX_{max}$ increases in inverse proportion to a decrease in the catalyst temperature TC.

In the embodiment of the present invention, as shown in broken lines in FIG. 3, a main target ammonia adsorption amount $NX(1+2)$ and a sub target ammonia adsorption amount $NX(1)$ are set in advance. The main target ammonia adsorption amount $NX(1+2)$ is set for a total adsorption amount of ammonia in the first and second adsorption states. The sub target ammonia adsorption amount $NX(1)$ is set for the adsorption amount of ammonia in the first adsorption state. This sub target ammonia adsorption amount $NX(1)$ represents the target ammonia adsorption amount for the concentration of ammonia that is desorbed from the first adsorption state below the certain allowable level.

As apparent from FIG. 3, the main target ammonia adsorption amount $NX(1+2)$ is set as the ammonia adsorption amount $\Sigma NH_3$ that is slightly smaller than the saturated ammonia adsorption amount $NX_{max}$ at any catalyst temperature TC. Meanwhile, the sub target ammonia adsorption amount $NX(1)$ is set smaller than the main target ammonia adsorption amount $NX(1+2)$ at the same temperature, and is also set to be primarily in the low-temperature region.

As described above, $NO_x$ in the exhaust gases primarily reacts with ammonia, which is adsorbed on the $NO_x$ selective reduction catalyst 13, and is reduced. In this case, ammonia in the second adsorption state exhibits the substantially higher $NO_x$ reduction efficiency than ammonia in the first adsorption state. In other words, the $NO_x$ purification efficiency of ammonia in the first adsorption state is not high. However, the more ammonia is adsorbed in the first adsorption state, the higher $NO_x$ purification efficiency of ammonia in the first adsorption state becomes. Thus, the main target ammonia adsorption amount $NX(1+2)$ of all ammonia in the first and second adsorption states is set to approximate the saturated ammonia adsorption amount $NX_{max}$ as close as possible. Basically, the supply amount of the urea solution, that is, the supply amount of ammonia is controlled such that the total ammonia adsorption amount equals the main target ammonia adsorption amount $NX(1+2)$.

When the adsorption amount of ammonia in the first adsorption state exceeds the sub target ammonia adsorption amount $NX(1)$, the concentration of desorbed ammonia exceeds the allowable level. Thus, the adsorption amount of ammonia in the first adsorption state is controlled not to exceed the sub target ammonia adsorption amount $NX(1)$. In the embodiment of the present invention, the supply amount of the urea solution, that is, the supply amount of ammonia is controlled such that the adsorption amount of ammonia in the first adsorption state does not exceed the sub target ammonia adsorption amount $NX(1)$, and that the total ammonia adsorption amount equals the main target ammonia adsorption amount $NX(1+2)$.

In the embodiment of the present invention, the supply amount of the urea solution is controlled on the basis of an estimated supply amount of ammonia. Specifically, in the embodiment of the present invention, the adsorption amount of ammonia in the second adsorption state is estimated in addition to the adsorption amount of ammonia in the first adsorption state. Then, based on the estimations of the ammonia adsorption amount in the first and second adsorption states, the supply amount of the urea solution, that is, the supply amount of ammonia is controlled.

A description will now be made on a method for estimating the ammonia adsorption amount with reference to FIG. 4. In the embodiment of the present invention, an estimated adsorption amount $\Sigma NH_3(1)_n$ of ammonia in the first adsorption state and an estimated adsorption mount $\Sigma NH_3(2)_n$ of ammonia in the second adsorption state are repeatedly calculated at specified time intervals based on following equations:

$$\Sigma NH_3(1)_n \leftarrow \Sigma NH_3(1)_{n-1} + Q_1 - M_1 - F \quad (1); \text{ and}$$

$$\Sigma NH_3(2)_n \leftarrow \Sigma NH_3(2)_{n-1} + Q_2 - M_2 + F \quad (2).$$

In the above equation (1), $\Sigma NH_3(1)_{n-1}$ represents the estimated adsorption amount of ammonia in the first adsorption state that is calculated last time, $Q_1$ represents an adsorption amount of ammonia that has been added and adsorbed in the first adsorption state since the last calculation, and $M_1$ represents a consumption amount of ammonia in the first adsorption state that has been consumed for $NO_x$ purification since the last calculation.

In the above equation (2), $\Sigma NH_3(2)_{n-1}$ represents the estimated adsorption amount of ammonia in the second adsorption state that is calculated last time, $Q_2$ represents an adsorption amount of ammonia that has been added and adsorbed in the second adsorption state since the last calculation, and $M_2$ represents a consumption amount of ammonia in the second adsorption state that has been consumed for $NO_x$ purification since the last calculation.

In addition, in the above equations (1) and (2), F represents an amount of adsorbed ammonia that has been changed from the first adsorption state to the second adsorption state since the last calculation.

$Q_1$ and $Q_2$ will be described first. If the amount Q of ammonia has been added since the last calculation, this amount Q of ammonia is adsorbed on the $NO_x$ selective reduction catalyst 13 in either the first adsorption state or the second adsorption state depending on the temperature TC of the $NO_x$ selective reduction catalyst 13. In FIG. 4B, $N_1$ represents a proportion of the adsorption amount $Q_1$ of ammonia in the first adsorption state, while $N_2$ represents a proportion of the ammonia adsorption amount $Q_2$ in the second adsorption state. Here, $N_1 + N_2 = 1.0$.

In the low-temperature region at or below 200° C., a major portion of added ammonia is adsorbed in the first adsorption state. Thus, $N_1$ is larger in the low-temperature region than $N_2$. On the other hand, in the high-temperature region above 200° C., the major portion of added ammonia is adsorbed in the second adsorption state, and thus, $N_2$ is larger in the high-temperature region than $N_1$.

Figure 4A:
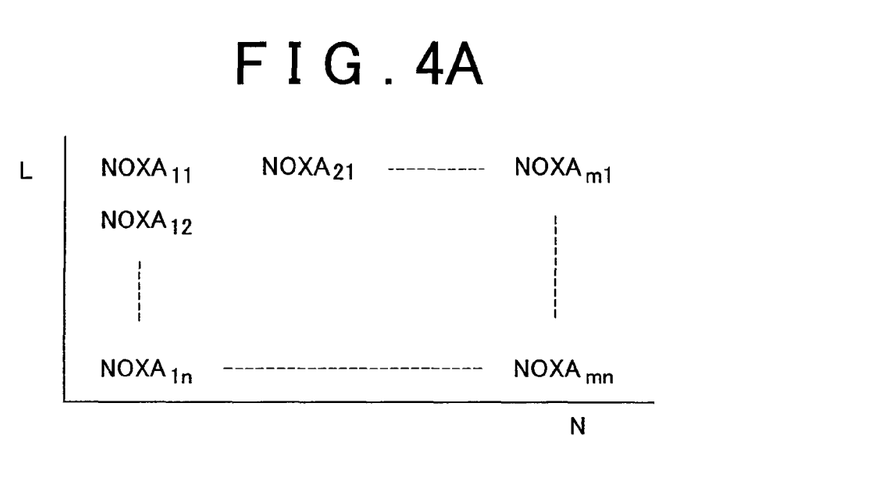
FIG. 4A is a map that represents $NO_x$ discharge amount NOXA from the engine.
Figure 4B:
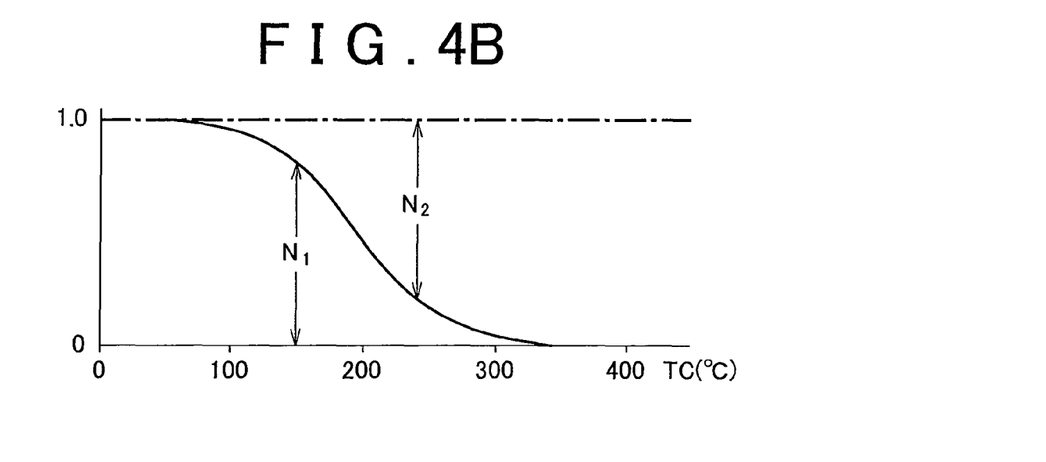
FIG. 4B is a graph that represents a ratio between ammonia that is adsorbed in a first adsorption state and ammonia that is adsorbed in a second adsorption state on a $NO_x$ selective reduction catalyst.

A relationship among $N_1$ and $N_2$, which are shown in FIG. 4B, and the catalyst temperature TC is stored in the ROM 32 in advance. The amount of ammonia $Q_1 (=N_1 \cdot Q)$ that is adsorbed in the first adsorption state and the amount of ammonia $Q_2 (=N_2 \cdot Q)$ that is adsorbed in the second adsorption state are calculated from this relationship.

The consumption amounts $M_1$ in the equation (1) and $M_2$ in the equation (2) will be described next. In the embodiment of the present invention, a $NO_x$ purification ratio R by the $NO_x$ selective reduction catalyst 13 is calculated from concentration Din of $NO_x$ in the exhaust gas that flows into the $NO_x$ selective reduction catalyst 13 and concentration Dout of $NO_x$ in the exhaust gas that flows out of the $NO_x$ selective reduction catalyst 13. In this case, a $NO_x$ discharge amount NOXA from the engine per unit time is stored in advance in the ROM 32. Here, the $NO_x$ discharge amount NOXA is stored in a map form such as of FIG. 4A as a function between an engine load L and an engine speed N. The $NO_x$ concentration Din is calculated from the $NO_x$ discharge amount NOXA and an intake air amount GA, and the $NO_x$ concentration Dout is calculated on the basis of an output from the $NO_x$ sensor 28.

Once the $NO_x$ purification ratio R is obtained, a total consumption amount of adsorbed ammonia that has been used for $NO_x$ purification since the last calculation can be calculated on the basis of the $NO_x$ discharge amount NOXA and the $NO_x$ purification ratio R. At this time, $NO_x$ is actually reduced by ammonia in the first and second adsorption states. Thus, the total consumption amount of adsorbed ammonia is a sum of the consumption amount $M_1$ of ammonia in the first adsorption state and the consumption amount $M_2$ of ammonia in the second adsorption state.

As described above, since ammonia in the second adsorption state exhibits the substantially higher $NO_x$ purification efficiency than ammonia in the first adsorption state, the consumption amount $M_2$ of ammonia in the second adsorption state is larger than the consumption amount $M_1$ of ammonia in the first adsorption state. In the embodiment of the present invention, a ratio $\eta_1 : \eta_2$ between the ammonia consumption amount $M_1$ and the ammonia consumption amount $M_2$ is obtained in advance, and here $\eta_1 = 0.2$ and $\eta_2 = 0.8$.

A description will now be made on the amount F of adsorbed ammonia in the equations (1) and (2). When the temperature TC of the $NO_x$ selective reduction catalyst 13 is increased, a portion of adsorbed ammonia is changed from the first adsorption state to the second adsorption state. If a ratio of change is indicated as a coefficient of change $\sigma$, the amount F of adsorbed ammonia that is changed to the second adsorption state is calculated by multiplying the adsorption amount $\Sigma NH_3(1)_{n-1}$ of ammonia in the first adsorption state, which is calculated last time, by the coefficient of change $\sigma$, $F = \sigma \cdot \Sigma NH_3(1)_{n-1}$.

Figure 4C:
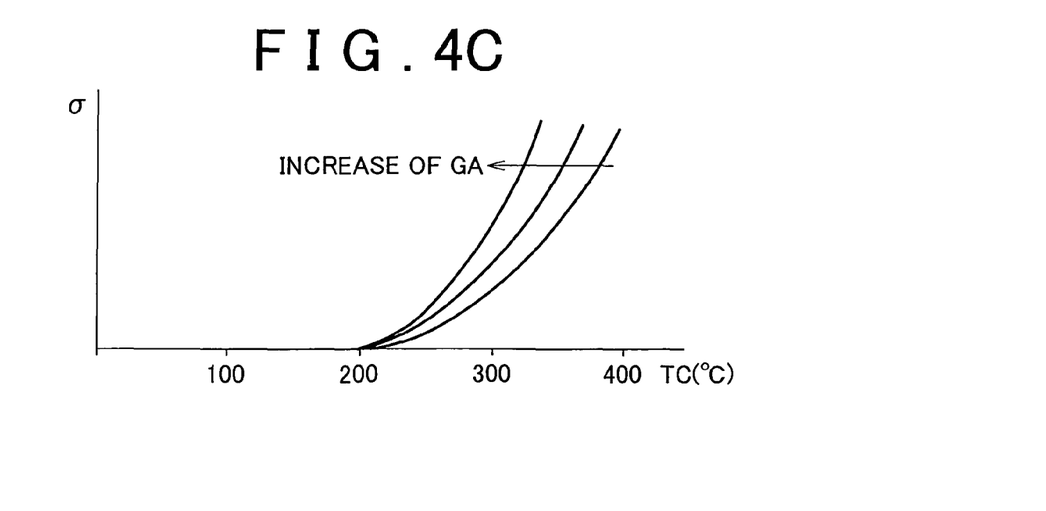
FIG. 4C is a graph that represents a ratio of change of adsorbed ammonia from the first adsorption state to the second adsorption state, and that also represents a relationship between a temperature of the $NO_x$ selective reduction catalyst and an intake air amount.

As shown in FIG. 4C, the coefficient of change $\sigma$ is a function between the temperature TC of the $NO_x$ selective reduction catalyst 13 and the intake air amount GA. Specifically, when the catalyst temperature TC is in the high-temperature region, the coefficient of change $\sigma$ increases in proportion to the increase of the catalyst temperature TC. In addition, when the intake air amount GA is increased, or when the flow rate of the exhaust gases is increased, the large amount of ammonia or urea that is adsorbed in the upstream side of the $NO_x$ selective reduction catalyst 13 is dispersed into the downstream side, and the amount of activated ammonia is increased. Thus, the coefficient of change σ increases in proportion to the increase of the intake air amount GA at the same catalyst temperature TC. A relationship among the coefficient of change σ, the catalyst temperature TC, and the intake air amount GA, which is shown in FIG. 4C, is stored in advance in the ROM 32.

As described above, in the embodiment of the present invention, the amount F of adsorbed ammonia is estimated that is changed from the first adsorption state to the second adsorption state when the temperature TC of the $NO_x$ selective reduction catalyst 13 is increased. Then, based on this estimated change amount F of adsorbed ammonia, the estimated adsorption amount $\Sigma NH_3(1)_n$ of ammonia in the first adsorption state and the estimated adsorption amount $\Sigma NH_3(2)_n$ of ammonia in the second adsorption state are corrected.

Figure 5:
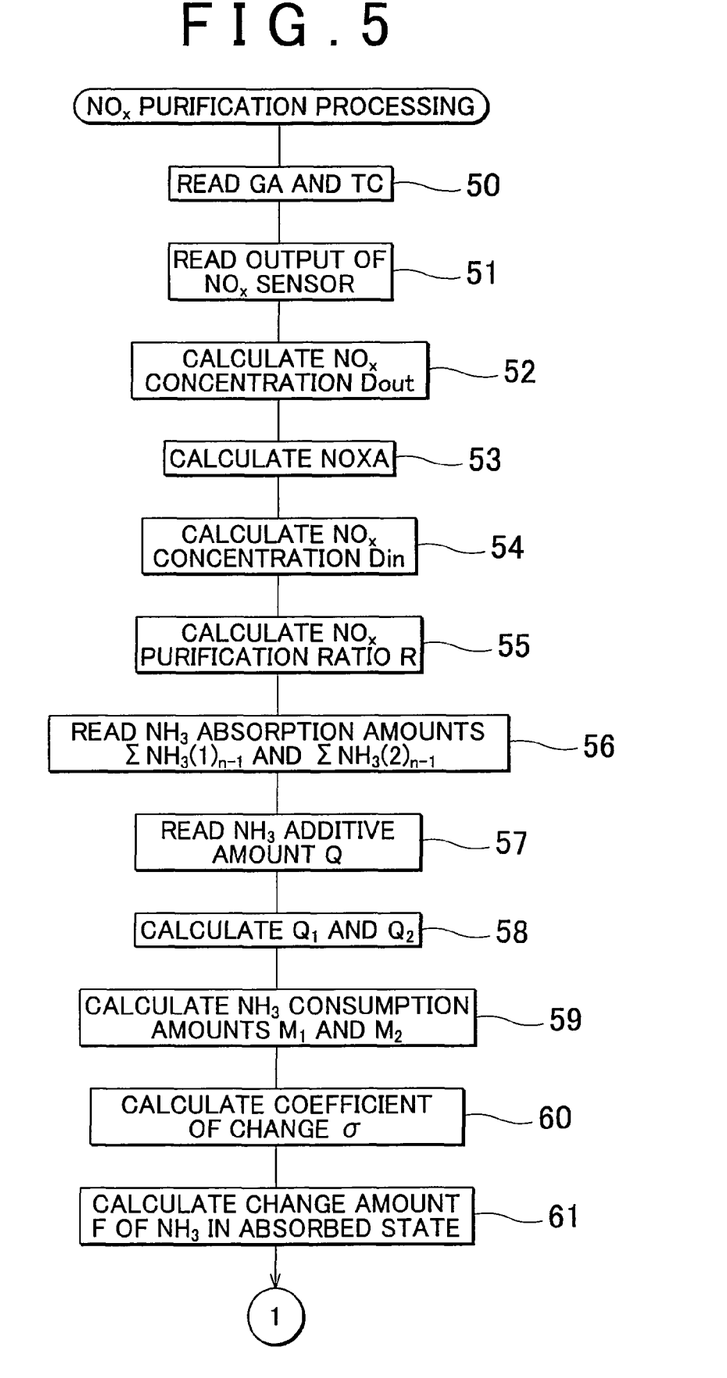
FIG. 5 is a flow chart to execute $NO_x$ purification processing.

Now, a description will be made on a $NO_x$ purification processing routine with reference to FIG. 5 through FIG. 7. This $NO_x$ purification processing routine is executed by an interrupt at specified time intervals. Referring to FIG. 5, first in step 50, the intake air amount GA and the temperature TC of the $NO_x$ selective reduction catalyst 13 are read. The intake air amount GA is detected by the intake air amount detector 8, and the temperature TC of the $NO_x$ selective reduction catalyst 13 is estimated from a detection signal of the temperature sensor 29. In step 51, the output of the $NO_x$ sensor 28 is read. Next in step 52, the concentration Dout of $NO_x$ in the exhaust gases, which flows out of the $NO_x$ selective reduction catalyst 13, is calculated on the basis of the output of the $NO_x$ sensor 28.

In step 53, the $NO_x$ discharge amount NOXA per unit time is calculated from the map shown in FIG. 4A. Next in step 54, the concentration Din of $NO_x$ in the exhaust gases, which flows into the $NO_x$ selective reduction catalyst 13, is calculated from the $NO_x$ discharge amount NOXA and the intake air amount GA. In step 55, the $NO_x$ purification ratio R(= (Din−Dout)/Din) is calculated.

In step 56, the estimated adsorption amount $\Sigma NH_3(1)_{n-1}$ of ammonia in the first adsorption state and the estimated adsorbed mount $\Sigma NH_3(2)_{n-1}$ of ammonia in the second adsorption state, which are calculated in the last interrupt, are read. In step 57, based on the supply amount of the urea solution, the additive amount Q of ammonia that has been added since the last interrupt is read. Next in step 58, $N_1$ and $N_2$ are calculated from the relationship shown in FIG. 4B. Based on $N_1$ and $N_2$, the amount $Q_1$ (=$N_1 \cdot Q$) of ammonia that is adsorbed in the first adsorption state and the amount $Q_2$ (=$N_2 \cdot Q$) of ammonia that is adsorbed in the second adsorption state are calculated.

In step 59, the consumption amount $M_1$ of ammonia in the first adsorption state and the consumption amount $M_2$ of ammonia in the second adsorption state are calculated. Specifically, based on the $NO_x$ discharge amount NOXA, which is calculated from the map shown in FIG. 4A, and also based on the $NO_x$ purification ratio R, the total consumption amount of adsorbed ammonia that has been consumed for $NO_x$ purification since the last interrupt is calculated. Then, the consumption amount $M_1$ of ammonia in the first adsorption state is calculated by multiplying the total consumption amount of adsorbed ammonia by $\eta_1$ (=0.2). The consumption amount $M_2$ of ammonia in the second adsorption state is also calculated by multiplying the total consumption amount of adsorbed ammonia by $\Theta_2$ (=0.8).

In step 60, the coefficient of change σ is calculated from the relationship shown in FIG. 4C. Then in step 61, the change amount F (=$\sigma \cdot \Sigma NH_3(1)_{n-1}$) of adsorbed ammonia from the first adsorption state to the second adsorption state is calculated by multiplying the estimated adsorption amount $\Sigma NH_3(1)_{n-1}$ of ammonia in the first adsorption state, which is calculated in the last interrupt, by the coefficient of change σ.

In step 62, the estimated adsorption amount $\Sigma NH_3(1)_n$ of ammonia in the first adsorption state is calculated on the basis of the following equation.

$$\Sigma NH_3(1)_n \leftarrow \Sigma NH_3(1)_{n-1} + Q_1 - M_1 - F$$

In step 63, the estimated adsorption amount $\Sigma NH_3(2)_n$ of ammonia in the second adsorption state is calculated on the basis of the following equation.

$$\Sigma NH_3(2)_n \leftarrow \Sigma NH_3(2)_{n-1} + Q_2 - M_2 + F$$

Next in step 64, the total ammonia adsorption amount $\Sigma NH_3$ (=$\Sigma NH_3(1)_n + \Sigma NH_3(2)_n$) is the sum of the estimated adsorption amount $\Sigma NH_3(1)_n$ of ammonia in the first adsorption state and of the estimated adsorption amount $\Sigma NH_3(2)_n$ of ammonia in the second adsorption state.

In step 65, the main target ammonia adsorption amount NX(1+2) and the sub target ammonia adsorption amount NX(1) that correspond to the catalyst temperature TC are calculated from the relationship shown in FIG. 3. In step 66, it is determined whether the total ammonia adsorption amount $\Sigma NH_3$ exceeds the main target ammonia adsorption amount NX(1+2). If $\Sigma NH_3 \leq NX(1+2)$, the routine proceeds to step 67 to determine whether or not the estimated adsorption amount $\Sigma NH_3(1)_n$ of ammonia in the first adsorption state is larger than the sub target ammonia adsorption amount NX(1). If $\Sigma NH_3(1)_n \leq NX(1)$, the routine proceeds to step 68 to add the specified amount Q of ammonia. Actually, the amount of urea solution whose ammonia content equals the amount Q is supplied.

Specifically, the estimated ammonia adsorption amounts $\Sigma NH_3(1)_n$ and $\Sigma NH_3(2)_n$ when the additive amount Q of ammonia is added are calculated. Then, if the total ammonia adsorption amount $\Sigma NH_3$, which is the sum of the estimated ammonia adsorption amounts $\Sigma NH_3(1)_n$ and $\Sigma NH_3(2)_n$, does not exceed the main target ammonia adsorption amount NX(1+2), and if the estimated ammonia adsorption amount $\Sigma NH_3(1)_n$ does not exceed the sub target ammonia adsorption amount NX(1), the additive amount Q of ammonia is added. After the additive amount Q of ammonia is added, the routine proceeds to step 69 in which $\Sigma NH_3(1)_{n-1}$ is substituted for $\Sigma NH_3(1)_n$. Then in step 70, $\Sigma NH_3(2)_{n-1}$ is substituted for $\Sigma NH_3(2)_n$.

On the other hand, if it is determined in step 66 that $\Sigma NH_3 > NX(1+2)$, or if it is determined in step 67 that $\Sigma NH_3(1)_n > NX(1)$, the routine proceeds to step 71 in which addition of ammonia is stopped. When the addition of ammonia is stopped, $Q_1$ and $Q_2$ become zero. In this case, the routine proceeds to step 72 in which the estimated adsorption amount $\Sigma NH_3(1)_n$ of ammonia in the first adsorption state is calculated on the basis of the following equation.

$$\Sigma NH_3(1)_n \leftarrow \Sigma NH_3(1)_{n-1} - M_1 - F$$

In step 73, the estimated adsorption amount $\Sigma NH_3(2)_n$ of ammonia in the second adsorption state is calculated on the basis of the following equation.

$$\Sigma NH_3(2)_n \leftarrow \Sigma NH_3(2)_{n-1} - M_2 + F$$

Then, the routine proceeds to step 69.

As described above, in the embodiment of the present invention, when the estimated adsorption amount $\Sigma NH_3(1)_n$ of ammonia in the first adsorption state is smaller than the sub target ammonia adsorption amount NX(1), ammonia is added such that the total ammonia adsorption amount $\Sigma NH_3$ equals the main target ammonia adsorption amount NX(1+2). Meanwhile, even when the total ammonia adsorption amount $\Sigma NH_3$ is smaller than the main target ammonia adsorption amount NX(1+2), the addition of ammonia or the supply of the urea solution is stopped once the estimated adsorption amount $\Sigma NH_3(1)_n$ of ammonia in the first adsorption state exceeds the sub target ammonia adsorption amount NX(1).

A description will now be made on an embodiment in which the total ammonia adsorption amount $\Sigma NH_3$ is allowed to be increased by forcibly changing the adsorption state of ammonia from the first adsorption state to the second adsorption state. More specifically, as described above, when the temperature of the $NO_x$ selective reduction catalyst 13 is increased, the adsorption state of ammonia is changed from the first adsorption state to the second adsorption state. Accordingly, in this embodiment, when the estimated adsorption amount $\Sigma NH_3(1)_n$ of ammonia in the first adsorption state exceeds an ammonia adsorption amount $(NX(1)-\alpha)$ that is smaller than the sub target ammonia adsorption amount $NX(1)$ by a specified amount $\alpha$, the temperature of the $NO_x$ selective reduction catalyst 13 is increased so that the adsorption state of ammonia is changed from the first adsorption state to the second adsorption state.

Figure 6:
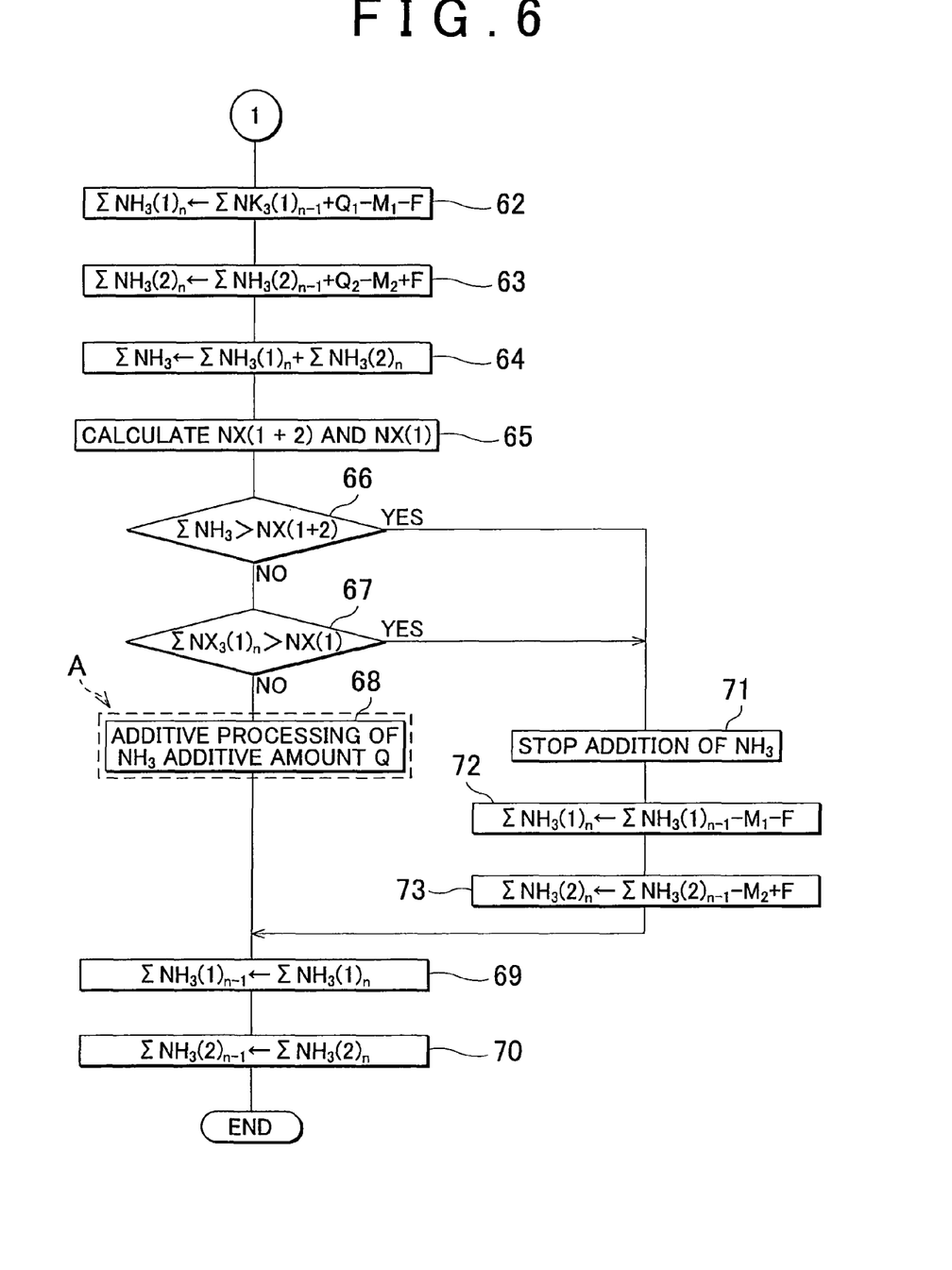
FIG. 6 is a flow chart to execute the $NO_x$ purification processing.
Figure 7:
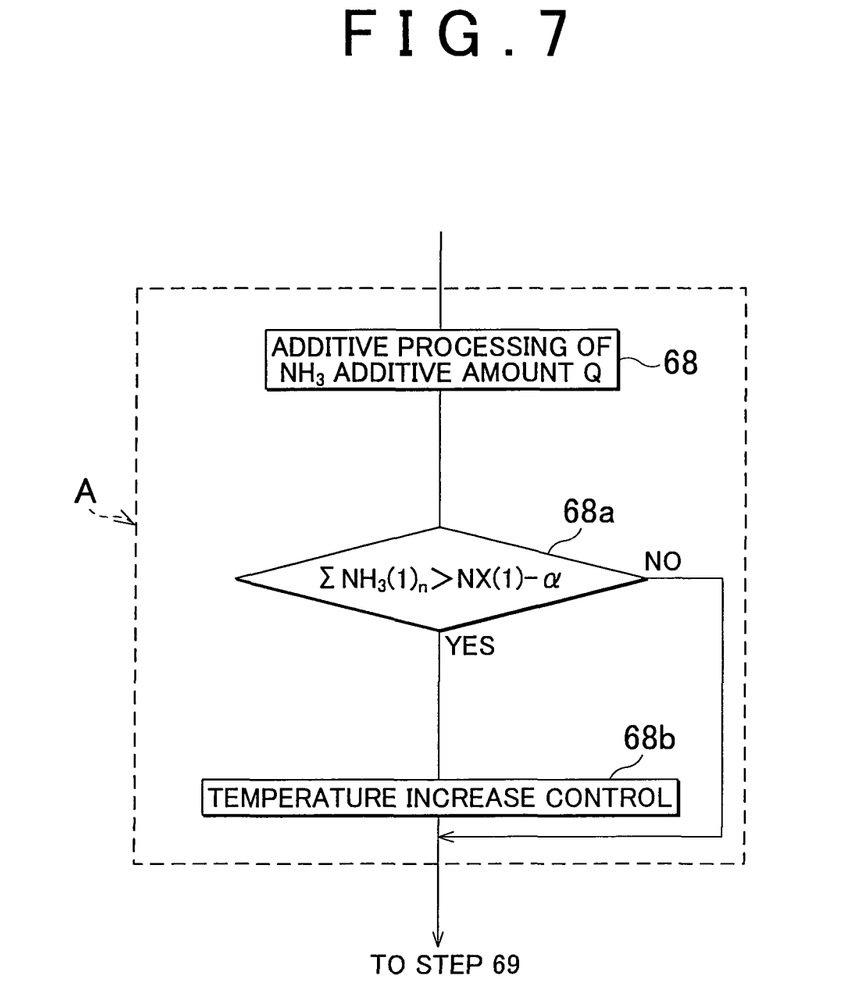
FIG. 7 is a part of flow chart to execute the $NO_x$ purification processing.

The $NO_x$ purification processing in this embodiment is executed by changing a part "A" in FIG. 6, which is surrounded by a broken line, to processes shown in FIG. 7. Specifically, in this embodiment, as shown in FIG. 7, when the additive processing of ammonia in step 68 is completed, the routine proceeds to step 68a in which it is determined whether or not the estimated adsorption amount $\Sigma NH_3(1)_n$ of ammonia in the first adsorption state is larger than the ammonia adsorption amount $(NX(1)-\alpha)$. If $\Sigma NH_3(1)_n > (NX(1)-\alpha)$, the routine proceeds to step 68b in which the temperature of the $NO_x$ selective reduction catalyst 13 is increased. This temperature increase control is executed by delaying injection timing of the fuel injection valve 3 and then by increasing the temperature of the exhaust gases.

The invention claimed is:

1. An exhaust gas purification system for an internal combustion engine, comprising:
   a $NO_x$ selective reduction catalyst that is disposed in an exhaust passage of the engine,
   the $NO_x$ selective reduction catalyst being supplied with ammonia that is adsorbed on the $NO_x$ selective reduction catalyst, and selectively reducing $NO_x$ in exhaust gases with the adsorbed ammonia,
   there existing a first adsorption state and a second adsorption state of the ammonia: in the first adsorption state, when a temperature of the $NO_x$ selective reduction catalyst being in a low-temperature region, the ammonia being adsorbed onto the $NO_x$ selective reduction catalyst and, upon a temperature increase of the $NO_x$ selective reduction catalyst, a desorption amount of the ammonia reaching maximum in the low-temperature region; and in the second adsorption state, when the temperature of the $NO_x$ selective reduction catalyst being in a high-temperature region and being higher than the highest temperature in the low-temperature region, the ammonia being adsorbed onto or having already been adsorbed on the $NO_x$ selective reduction catalyst, and upon the temperature increase of the $NO_x$ selective reduction catalyst, the desorption amount of the ammonia reaching maximum in the high-temperature region,
   the ammonia, which has been in the first adsorption state and which is desorbed from the $NO_x$ selective reduction catalyst, being more likely to pass through the $NO_x$ selective reduction catalyst without purifying $NO_x$ than the ammonia, which has been in the second adsorption state, and which is desorbed from the $NO_x$ selective reduction catalyst; and
   a control section that estimates the adsorption amount of the ammonia in the first adsorption state and controls the adsorption amount of the ammonia in the first adsorption state,
   the control section estimates the adsorption amount of the ammonia in the second adsorption state and controls a supply amount of the ammonia on the basis of the estimated adsorption amount of the ammonia in the first adsorption state and the estimated adsorption amount of the ammonia in the second adsorption state,
   a main target ammonia adsorption amount is set for a total adsorption amount of the ammonia in the first adsorption state and the second adsorption state, a sub target ammonia adsorption amount is set for the adsorption amount of the ammonia in the first adsorption state, and the sub target ammonia adsorption amount is set smaller than the main target ammonia adsorption amount at a same temperature of the $NO_x$ selective reduction catalyst, and
   the control section controls the supply amount of the ammonia such that the adsorption amount of the ammonia in the first adsorption state is smaller than the sub target ammonia adsorption amount and that the total ammonia adsorption amount is approximately the same as the main target ammonia adsorption amount.

2. The exhaust gas purification system for an internal combustion engine according to claim 1, wherein
   the control section controls the adsorption amount of the ammonia in the first adsorption state on the basis of the estimated adsorption amount of the ammonia in the first adsorption state in order to control concentration of the ammonia, which has been in the first adsorption state and which is desorbed from the $NO_x$ selective reduction catalyst, upon a temperature increase of the $NO_x$ selective reduction catalyst, within an allowable concentration level.

3. The exhaust gas purification system for an internal combustion engine according to claim 1, wherein
   the sub target of the ammonia adsorption amount is set such that concentration of the ammonia, which has been in the first adsorption state and which is desorbed from the $NO_x$ selective reduction catalyst, is within the allowable concentration level when the temperature of the $NO_x$ selective reduction catalyst is increased, and
   the control section controls a supply amount of the ammonia such that the adsorption amount of the ammonia in the first adsorption state is smaller than the sub target ammonia adsorption amount.

4. The exhaust gas purification system for an internal combustion engine according to claim 1, wherein
   when the estimated adsorption amount of the ammonia in the first adsorption state exceeds an ammonia adsorption amount that is smaller than the sub target ammonia adsorption amount by a specified amount, the temperature of the $NO_x$ selective reduction catalyst is increased in order to change the adsorption state of the ammonia from the first adsorption state to the second adsorption state.

5. The exhaust gas purification system for an internal combustion engine according to claim 1, wherein
the control section calculates a consumption amount of the adsorbed ammonia that is consumed for $NO_x$ purification when estimating the adsorption amount of the ammonia in the first adsorption state and the adsorption amount of the ammonia in the second adsorption state, and
the consumption amount of the ammonia in the second adsorption state is set larger than the consumption amount of the ammonia in the first adsorption state.

6. The exhaust gas purification system for an internal combustion engine according to claim 1, wherein
the control section estimates a change amount of the adsorbed ammonia from the first adsorption state to the second adsorption state upon the temperature increase of the $NO_x$ selective reduction catalyst, and corrects the estimated adsorption amount of the ammonia in the first adsorption state and the estimated adsorption amount of the ammonia in the second adsorption state on the basis of an estimated change amount of the adsorbed ammonia.

7. The exhaust gas purification system for an internal combustion engine according to claim 1, further comprising:
a supply device that supplies the ammonia to the $NO_x$ selective reduction catalyst;
a load sensor that detects a load on the internal combustion engine; and
a $NO_x$ sensor that detects concentration of $NO_x$ in exhaust gases that flow out of the $NO_x$ selective reduction catalyst,
wherein the control section calculates the concentration of $NO_x$ in the exhaust gases that flow in the $NO_x$ selective reduction catalyst on the basis of an input value from the load sensor, and calculates a $NO_x$ purification ratio of the $NO_x$ selective reduction catalyst from the concentrations of $NO_x$ in the exhaust gases that flow in and flow out of the $NO_x$ selective reduction catalyst, and
the control section estimates the adsorption amount of the ammonia in the first adsorption state and the adsorption amount of the ammonia in the second adsorption state on the basis of the supply amount of the ammonia, the calculated $NO_x$ purification ratio, and the temperature of the $NO_x$ selective reduction catalyst.

8. The exhaust gas purification system for an internal combustion engine according to claim 7, wherein
the main target ammonia adsorption amount is set for a total adsorption amount of the ammonia in the first adsorption state and the second adsorption state, and the sub target ammonia adsorption amount is set for the adsorption amount of the ammonia in the first adsorption state,
when the estimated adsorption amount of the ammonia in the first adsorption state is smaller than the sub target ammonia adsorption amount, and when an estimated total ammonia adsorption amount is smaller than the main target ammonia adsorption amount, the control section supplies the ammonia to the supply device such that the total ammonia adsorption amount is equal to the main target ammonia adsorption amount, and
when the estimated adsorption amount of the ammonia in the first adsorption state is larger than the sub target ammonia adsorption amount, the control section stops supplying the ammonia to the supply device.

* * * * *